US 6,543,389 B2

(12) United States Patent
Hedde

(10) Patent No.: US 6,543,389 B2
(45) Date of Patent: Apr. 8, 2003

(54) INSECTICIDAL PET COLLAR

(75) Inventor: Richard D. Hedde, Pawcatuck, CT (US)

(73) Assignee: Pfizer Inc., New York, NY (US)

( * ) Notice: Subject to any disclaimer, the term of this patent is extended or adjusted under 35 U.S.C. 154(b) by 0 days.

(21) Appl. No.: 10/176,692

(22) Filed: Jun. 21, 2002

(65) Prior Publication Data

US 2002/0195063 A1 Dec. 26, 2002

Related U.S. Application Data

(60) Provisional application No. 60/301,086, filed on Jun. 26, 2001.

(51) Int. Cl.[7] .......................... A01K 29/00; A01N 25/34
(52) U.S. Cl. ........................................ 119/654; 424/411
(58) Field of Search ................. 119/652, 653, 119/654; 424/411

(56) References Cited

U.S. PATENT DOCUMENTS

| | | | |
|---|---|---|---|
| 2,205,711 A | 6/1940 | Banks | 119/654 |
| 2,808,030 A | 10/1957 | Costanzo | 119/654 |
| 3,318,769 A | 5/1967 | Folckemer et al. | 167/42 |
| 3,477,409 A | 11/1969 | Costanzo | 119/654 |
| 3,814,061 A | 6/1974 | Aries et al. | 119/654 |
| 3,852,416 A | 12/1974 | Grubb et al. | 424/14 |
| 3,904,746 A | 9/1975 | Aries | 424/28 |
| 4,068,624 A | 1/1978 | Ramney | 119/654 |
| 4,150,109 A | 4/1979 | Dick et al. | 424/28 |
| 4,438,137 A | 3/1984 | Allan | 424/330 |
| 4,543,247 A | 9/1985 | von Bittera et al. | 424/14 |
| 4,606,478 A | 8/1986 | Hack et al. | 222/187 |
| 4,689,339 A | 8/1987 | Karjalainen et al. | 514/396 |
| 4,853,230 A | 8/1989 | Lovgren et al. | 424/466 |
| 4,930,451 A | 6/1990 | Miller et al. | 119/654 |
| 5,194,265 A | 3/1993 | Boettcher et al. | 424/411 |
| 5,294,445 A | 3/1994 | Sieveking et al. | 424/411 |
| 5,338,533 A | 8/1994 | Derrieu | 424/411 |
| 5,437,869 A | 8/1995 | Kelley | 424/406 |
| 5,555,848 A * | 9/1996 | Trujillo et al. | 119/654 |
| 5,660,844 A | 8/1997 | Christie et al. | 424/411 |
| 5,776,481 A | 7/1998 | Karst et al. | 424/411 |
| 6,382,137 B1 * | 5/2002 | Derrieu et al. | 119/654 |

FOREIGN PATENT DOCUMENTS

GB 1327935 8/1973

OTHER PUBLICATIONS

Estrada–Pena, A., et al., *JAVMA*, Comparison of an amitraz–impregnated collar with topical administration of fipronil for prevention of experimental and natural infestations by the brown dog tick(Rhipicephalus sanguineus), 214(12): 1799–1803, 1999.

Hugnet, C., et al., *AJVR*, "Toxicity and kinetics of amitraz in dogs", 57(10): 1506–1510, 1996.

* cited by examiner

*Primary Examiner*—Charles T. Jordan
*Assistant Examiner*—Elizabeth Shaw
(74) *Attorney, Agent, or Firm*—Peter C. Richardson; Gregg C. Benson; Christine S. Lee

(57) ABSTRACT

This invention relates to insecticidal pet collars useful in protecting animals against arthropods comprising amitraz, or a pharmaceutically acceptable salt thereof, and atipamezole.

9 Claims, 2 Drawing Sheets

INSECTICIDAL PET COLLAR

This application is claiming priority from co-pending Provisional Application No. 60/301,086 filed Jun. 26, 2001.

BACKGROUND OF THE INVENTION

This invention relates to collars useful in protecting animals against arthropods.

Animals are commonly treated to control fleas and ticks by spraying the coats of the animals with, or dipping the animals in, an insecticide solution. This type of treatment provides temporary protection, usually lasting about three weeks.

Alternately, an insecticidal ear tag is used. The tag releases insecticide as it rubs against the animal's coat. U.S. Pat. No. 4,606,478 refers to an ear tag which has a reservoir containing a liquid pesticide.

For dogs and cats, collars containing insecticidal compositions have been used to protect against fleas and ticks. U.S. Pat. Nos. 2,205,711 and 4,068,624 refer to collars having chemical insecticide embedded in the material that forms the collar. Other types of insecticidal collars for animals and plastic or resinous insecticide compositions for use in those collars are referred to in U.S. Pat. Nos. 2,808,030; 3,477,409; 3,814,061; 3,852,416 and 3,904,746.

Amitraz is a monoamine oxidase inhibitor (MAOI) used as an insecticide in collars that, as currently marketed, provide about four months of tick protection. Such collars are formed of an extruded matrix containing about 9% by weight of amitraz. As compared with fipronil, amitraz has been found to exert a significantly greater effect on numbers of live feeding ticks, egg hatchability, and larval viability. Estrada-Pena and Ascher, *J. Am. Vet. Med. Assn.*, 1999, 214:1799.

However, a number of dogs consume their amitraz containing collars, resulting in amitraz toxicosis. Symptoms of amitraz toxicosis include incoordination, depression, high blood sugar level, slow heart rate, and decreased body temperature. In severe cases, death may result. Affected dogs are often injected intramuscularly with atipamezole, an alpha-2 adrenoceptor antagonist which has been found to be effective in reversing effects of amitraz toxicosis. Hugnet et al., *Am. J. Vet. Res.*, 1996, 57:1506.

SUMMARY OF THE INVENTION

The present invention relates to an insecticidal pet collar comprising 0.1 to 40% by weight of amitraz, or a pharmaceutically acceptable salt thereof, and atipamezole wherein said atipamezole is present in a concentration sufficient to ameliorate poisoning of said pet upon ingestion by said pet of said collar.

In one embodiment, the atipamezole and atropine are incorporated into a matrix in the collar. For example, the collar can comprise a matrix formed of a polymer selected from the group consisting of polyvinyl chloride, polyolefin, polyurethane, polyamide, methacrylate, and silicon polymers. The collar is preferably formed in an extrusion process.

In another embodiment, the pet collar comprises 0.01 to 1%, preferably 0.1 to 1%, by weight of atipamezole. In a further embodiment, the pet collar comprises a matrix having therein about 9% by weight of amitraz. In yet another embodiment, the pet collar has a length of about 25 inches and contains amitraz in a concentration of about 100 mg/inch. In a further embodiment, the atipamezole is contained in a gastric labile coating.

DETAILED DESCRIPTION OF THE INVENTION

Figure 1:
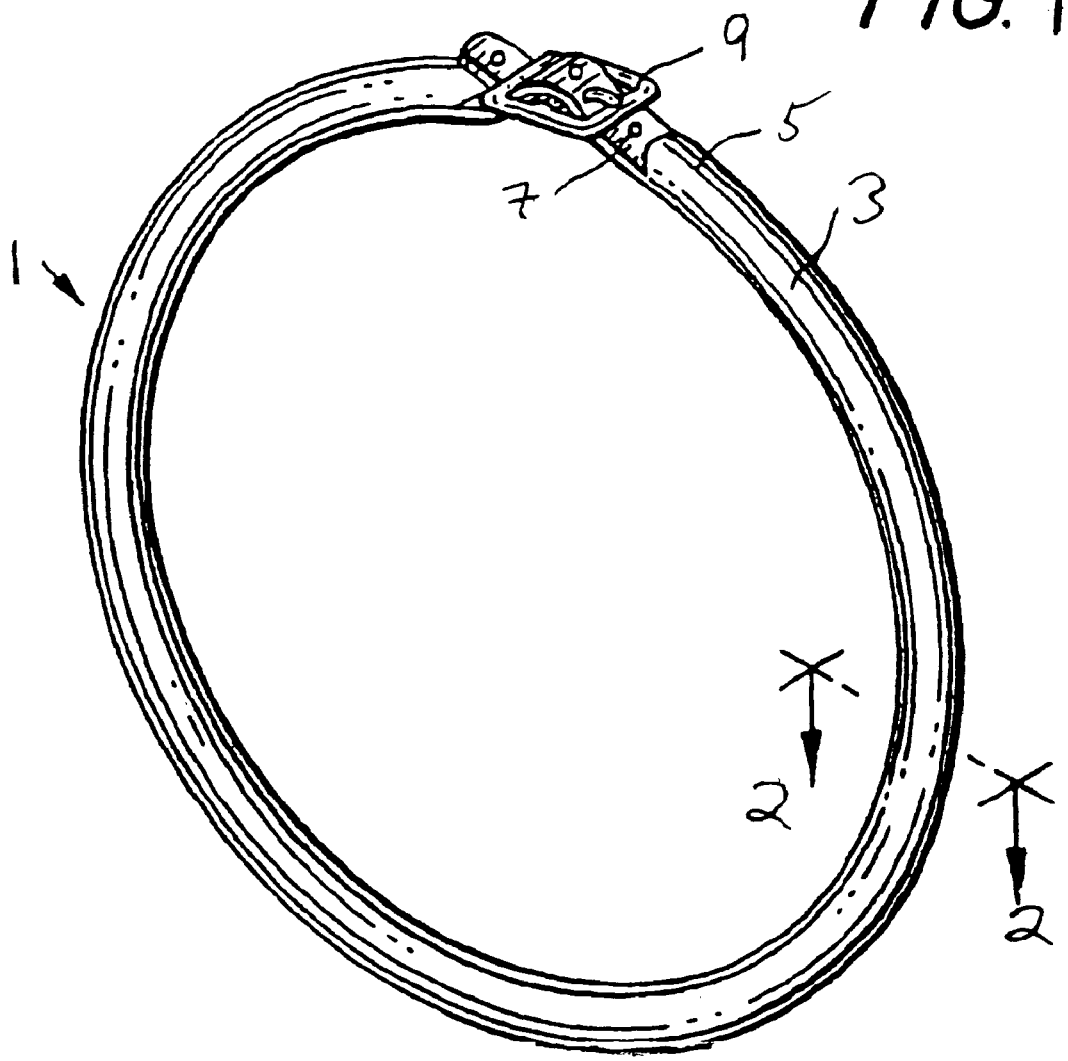
FIG. 1 is a perspective view of the collar of the invention.

All patents, patent publications, and other references cited herein are hereby incorporated by reference in their entireties.

The collar of the present invention provides amelioration of amitraz toxicosis by inclusion of atipamezole in combination with the amitraz. Thus, an animal that ingests the collar will also ingest the atipamezole, and avoid, or delay, effects of amitraz toxicosis as a result of atipamezole's activity as an alpha-2 adrenoceptor antagonist. This can allow a pet owner, for example, additional time to reach a veterinarian in order to receive any additional treatment that might be necessary.

Amitraz has the chemical name 1,5-di-(2,4-dimethylphenyl)-3-methyl-1,3,5-triazapenta-1,4-diene, and an IUPAC name of N-methylbis(2,4-xylyliminomethyl)amine. It has a wide range of insecticidal and acaricidal properties. Its synthesis is described in British Pat. Specification No. 1,327,935.

Atipamezole has the chemical name 4-(2-ethyl-2,3-dihydro-1H-inden-2-yl)-1H-imidazole. A method for the preparation of atipamezole is described in U.S. Pat. No. 4,689,339.

In one embodiment, the atipamezole is contained in a gastric labile coating. An appropriate coating is described in U.S. Pat. No. 4,853,230.

Many types of collars are available to those skilled in this art that may be employed in order to practice the present invention. These include, for example, those of U.S. Pat. Nos. 5,776,481; 4,930,451; 5,338,533; 5,294,445; 5,194,265 and 5,660,844.

Examples of PVC (polyvinyl chloride) for use in forming the collar are described in U.S. Pat. Nos. 3,318,769; 3,852,416; 4,150,109; and 5,437,869. Suitable plasticizers include adipates, phthalates, phosphates and citrates. Particular examples of plasticizers include diethyl phthalate, dioctyl sebacate, dioctyl adipate, diisodecyl phthalate, acetyl tributyl citrate, diethyl hexyl phthalate, di-n-butyl phthalate, benzyl butyl phthalate, acetyl tributyl citrate, tricresyl phosphate, and 2-ethylhexyl diphenyl phosphate. A secondary plasticizer can also be used, e.g., acetyl triethyl citrate, triethyl citrate, triacetin, diethylene glycol, monoethyl ether, or triphenyl phosphate. A conventional stabilizer may also be employed. A filler can be employed, such as barium sulphate, calcium carbonate, zeolite, diatomaceous earth, kaolin, talc, silica, hydrated calcium silicate, antimony trioxide, titanium oxide, natural or synthetic textile fibre, or sawdust.

Polyurethane suitable for making the collar is described in U.S. Pat. No. 4,543,247.

While inclusion of the active ingredients in a matrix is preferred, it is not required. A suitable collar that contains amitraz in a gel reservoir is described in U.S. Pat. No. 5,660,844. According to the present invention, atipamezole may also be included in the gel reservoir to avoid toxicosis.

The collar is formed by conventional methods, including extrusion and casting.

If desired the amitraz can be used in combination with a stabilizer, such as is described in U.S. Pat. No. 4,438,137.

If desired, the collar may contain additional insecticides. Such insecticides include phosmet, tetramethrin, chlorpyrifos, bromophos, permethrin, cypermethrin, and deltamethrin. These insecticides are well known, and commonly available.

The active ingredient or ingredients are preferably present in the collar in excess of the amount required to produce the desired effect. This ensures that an effective amount of the active ingredient is applied to the animal. For example, the collar can contain about 1.5 to 3 times the effective amount of amitraz, or any other insecticide that is also included.

The phrase "pharmaceutically acceptable salt(s)", as used herein, includes salts of basic groups present in the compounds of the present invention. The acids that may be used to prepare pharmaceutically acceptable acid addition salts of such basic compounds are those that form non-toxic acid addition salts, i.e., salts containing pharmacologically acceptable anions, such as the hydrochloride, hydrobromide, hydroiodide, nitrate, sulfate, bisulfate, phosphate, acid phosphate, isonicotinate, acetate, lactate, salicylate, citrate, acid citrate, tartrate, pantothenate, bitartrate, ascorbate, succinate, maleate, gentisinate, fumarate, gluconate, glucaronate, saccharate, formate, benzoate, glutamate, methanesulfonate, ethanesulfonate, benzenesulfonate, p-toluenesulfonate and pamoate [i.e., 1,1-methyiene-bis-(2-hydroxy-3-naphthoate)] salts.

Figure 2:
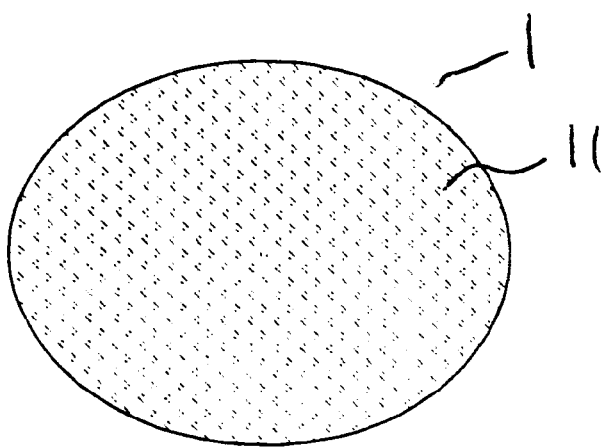
FIG. 2 is a cross-section view of the collar of FIG. 1.

FIG. 1 depicts a collar 1 of the invention, having a buckle 9, and a free end 7 having holes therein for inserting into the buckle. The collar has an outer surface 5 that is adapted to be applied against the pet's skin without causing irritation. In this embodiment, the collar results from extrusion of PVC, and is a solid material (having a substantially solid interior 3) wherein the active components, i.e., amitraz and atipamezole, are components in the extrusion mixture. FIG. 2 shows the collar in cross section wherein the active components 11 are substantially evenly distributed throughout the extruded PVC.

What is claimed is:

1. An insecticidal pet collar comprising 0.1 to 40% by weight of amitraz, or a pharmaceutically acceptable salt thereof, and atipamezole wherein said atipamezole is present in a concentration sufficient to ameliorate poisoning of said pet upon ingestion by said pet of said collar.

2. The pet collar of claim 1 wherein said amitraz and said atipamezole are incorporated into a matrix in said collar.

3. The pet collar of claim 2 wherein said matrix comprises a polymer selected from the group cosisting of polyvinyl chloride, polyolefin, polyurethane, polyamide, methacrylate, and silicon polymer.

4. The pet collar of claim 1, 2 or 3 wherein said collar comprises 0.01 to 1% by weight of atipamezole.

5. The pet collar of claim 4 wherein said collar comprises a matrix having therein about 9% by weight of amitraz.

6. The pet collar of claim 1 wherein said collar has a length of about 25 inches and contains amitraz in a concentration of about 100 mg/inch.

7. The pet collar of claim 1 wherein said atipamezole is contained in a gastric labile coating.

8. The pet collar of claim 1, 2 or 3 wherein the collar is formed in an extrusion process.

9. The pet collar of claim 1, 2 or 3 wherein said collar contains amitraz in a concentration of about 100 mg/inch.

* * * * *